US004001710B2

United States Statutory Invention Registration [19]

[11] Reg. Number: H1710

[45] Published: Feb. 3, 1998

Davis

[54] TENNIS RACQUETS

[76] Inventor: Stephen J. Davis, 106 Bruce Rd., Washington Crossing, Pa. 18977

[21] Appl. No.: 424,886

[22] Filed: Apr. 19, 1995

[51] Int. Cl.[6] ..... A63B 51/00

[52] U.S. Cl. ..... 473/542; 473/539; 473/548

[58] Field of Search ..... 273/73 R, 73 C, 273/73 D, 73 L

[56] References Cited

U.S. PATENT DOCUMENTS

| | | | |
|---|---|---|---|
| 4,802,678 | 2/1989 | Svoma | 273/73 D |
| 5,037,097 | 8/1991 | Svoma et al. | 273/73 D X |
| 5,209,472 | 5/1993 | Tseng | 273/73 D X |
| 5,232,219 | 8/1993 | Tseng | 273/73 D |
| 5,236,197 | 8/1993 | Chen | 273/73 D |
| 5,263,709 | 11/1993 | Tseng | 273/73 D |
| 5,342,044 | 8/1994 | Yow | 273/73 D |
| 5,383,662 | 1/1995 | Gabrielidis | 273/73 D X |

FOREIGN PATENT DOCUMENTS

| | | | |
|---|---|---|---|
| 4010722 | 10/1991 | Germany | 273/73 D |
| 223151 | 10/1924 | United Kingdom | 273/73 D |

*Primary Examiner*—Michael J. Carone

[57] ABSTRACT

A tennis racquet has string holes which lie alternately on opposite sides of the center plane completely around the racquet head. Except in the corners, the cross string holes, and the upper main strings holes, are located at a constant offset distance of 4.5 millimeters (mm) away from the center plane of the frame. The corner string holes and remaining lower main string holes, which mainly lie in the throat bridge, all have a constant reduced stagger of 2 mm.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TENNIS RACQUETS

FIELD OF INVENTION

The present invention relates to a tennis racquet having an improved stinging system.

BACKGROUND OF THE INVENTION

Tennis racquets have a generally planar strung surface formed of interwoven main and cross strings which are anchored in string holes formed in the head portion of the frame. In conventional graphite and metal racquets, the string holes are all located in the same plane as the strung surface, so that the ends of the main strings and cross strings extend from the interwoven woven strung surface to the frame sides essentially in a straight line.

In older wooden racquets, the string holes, rather than all lying in the same plane, were sometimes offset from the center stringing plane and "staggered", such that consecutive string holes were located alternately on opposite sides of the center stringing plane. The main purposes of staggering the string holes was for greater frame strength. Forming holes tend to weaken the frame. By staggering the holes, consecutive holes were farther apart than if all the holes were in a common plane. Also, wooden racquets were laminates made of multiple plies. By spacing consecutive string holes on opposite sides of the center plane, the force of the strings tended to hold the wood plies together.

Martel French patent application No. 2,276,845 appears to be the earliest reference to disclose using staggered string holes for the purpose of improving the performance of the racquet. The offset distance of the holes from the center plane may either be constant around the frame or may vary. Martel, for example, discloses that the offset distance may vary as a function of the cross-sectional height of a variable height frame.

Kuebler DE-OS 30 18 354 discloses a tennis racquet having a staggered stringing system in which, rather than string holes, grooves are formed in the sides of the frame for the strings.

Taiwan Utility Model No. 140356 discloses another example of a staggered stringing system. The cross string holes, and the upper string holes for the main strings, are offset by a constant distance. However, the lower main string holes, which mostly are formed in the throat bridge, have no stagger.

More recently, Svoma et al. U.S. Pat. No. 5,037,097 discloses a staggered stringing system in which the offset distance of the cross string holes increases from zero at the top and bottom of the racquet face to a maximum at the middle of the racquet. Svoma discloses that, by varying the offset distance as a function of the length of each cross string, the offset will compensate for the difference in the lengths of the cross strings.

Svoma et al. also discloses a second embodiment in which the amount of offset of the string holes is constant around the frame. This is the same stringing system disclosed in Martel.

SUMMARY OF THE INVENTION

In conventional stringing patterns for tennis racquets, the outermost main strings cross over the uppermost and lowermost cross strings relatively far away from the frame wall, except in the corners of the racquet. In the corners of the racquet, these strings cross over one another very close to the frame wall. Therefore, the applicant found that, if a constant stagger hole pattern such as disclosed in Martel or Svoma et al., were to be used with a normal conventional string pattern, the corner strings left the string bed at a much sharper angle than the remaining strings. In order to reduce the potential for string breakage, it is necessary either to limit the stagger distance of the holes, so that the angle at which the corner strings diverge from the string bed is not excessive, or to reduce the stagger distance of the holes in the corners of the racquet.

The racquet I designed is based on the latter approach. The cross string holes lie alternately on opposite sides of the center plane, and are located at a constant offset distance of 4.5 millimeters (mm) away from the center plane of the frame, except for the upper and lower corner strings. Because the main and cross strings intersect very close to the frame in the corners of the racquet, the stagger distance of the corner string holes was reduced to from 4.5 to 2 mm, in order to avoid imposing too sharp a bending angle on the strings.

The string holes for the main strings also lie alternately on opposite sides of the center plane. The upper main string holes lie at a constant offset distance of 4.5 mm except for the corners of the racquet, where again the amount of offset is reduced to 2 mm. The lower main string holes, which mainly lie in the throat bridge, all have a constant reduced stagger of 2 mm.

Preferably, the racquet has an even number of main strings, and may have either an even number or odd number of cross strings. In the former case, the string holes for the opposite ends of the strings lie on opposite sides of the center plane. In the latter case, the string holes for the opposite ends of each main string lie on the same side of the plane.

A racquet having a staggered string pattern according to the present invention has been found to exhibit a number of performance improvements. The racquet exhibits a very quiet feel, due to the fact that when the ball makes impact, the strings anchored ahead of the string plane (i.e., facing the ball) elongate more than the strings anchored behind the string plane. This creates differing vibration modes between adjacent strings, helping to cancel string vibrations.

The stringing system also tends to reduce the "cupping" effect of normal string systems. The string bed of the staggered string system of the invention tends to deform more uniformly, over a larger area, which produces a truer rebound.

The flatter string bed deflection also tends to allow greater spin to be imparted to the ball, due to the fact that more of the string bed surface area contacts the ball.

Staggering the string hole locations also produces modal dampening, tending to stabilize the frame vibrations in the racquet. When a racquet deflects, it undergoes bending and torsional vibrations. By having the strings exit the frame at a staggered distance, it tends to stabilize primarily the torsional vibrations which indirectly stabilize the other vibrations present in the racquet. The overall effect is a quieter racquet frame.

Finally, the staggered string system of the present invention prolongs string life compared to conventional stringing systems. This is again due to the fact that the string bed remains flatter during ball impact, and therefore the load is spread over more strings than in the conventional pattern.

For a better understanding of the invention, reference is made to the following detailed description of a preferred embodiment, taken in conjunction with the drawings accompanying the application.

DETAILED DESCRIPTION OF PREFERRED EMBODIMENTS

Figure 1:
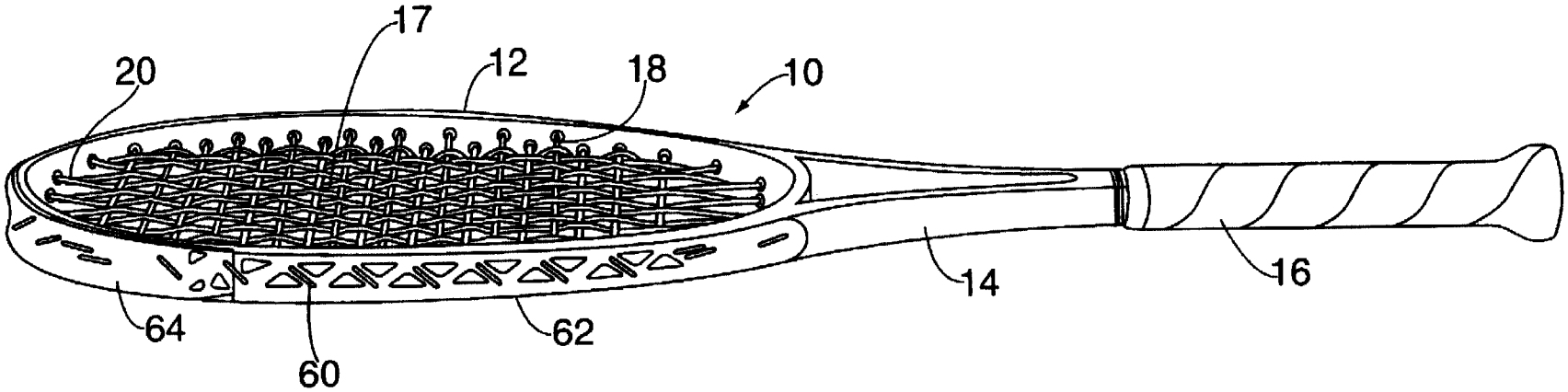
FIG. 1 is a perspective view of a tennis racquet according to the present invention.

A tennis racquet 10 includes a head portion 12, a throat region 14 formed by a pair of converging throat sections, a shaft containing a handle 16, and a plurality of strings interwoven to form a generally planar strung surface 17. As shown in FIG. 1, and described in more detail below, the ends 18 of the cross strings, and the ends 20 of the main strings, diverge from the central stringing plane 17 and enter string holes 24 which lie alternately on opposite sides of the center plane of the strung surface 17, and which holes 24 are offset from the center plane.

Figure 2:
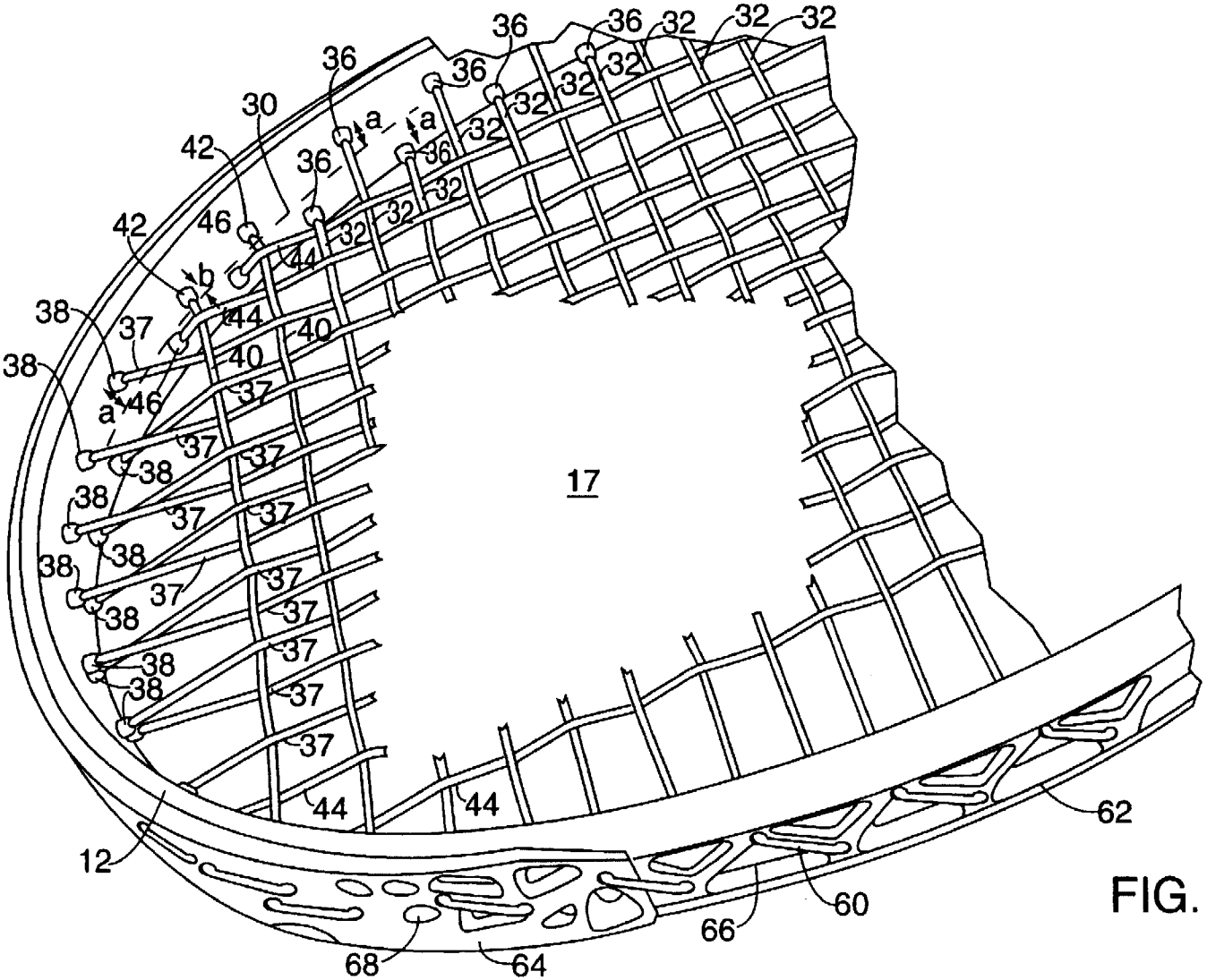
FIG. 2 is a perspective view, on an enlarged scale, the upper head portion of the racquet of FIG. 1.

FIG. 2 shows the upper portion of the head 12. The intersection of the center stringing plane 30 and the frame head portion 12 is shown in dashed lines. Each of the cross strings 32, except in the upper corners of the head 12, has a string hole 34 which is offset from the center plane 30 by a constant distance "a", which preferably is 4.5 mm. Similarly, each of the main strings 37, except in the corners, has an upper string hole 38 which is offset from the center plane by distance "a".

The upper two cross strings 40, and the two outermost main strings 44 on either side of the racquet face, enter string holes 42 and 46 respectively, which are offset from the center plane 30 by a distance "b". Were the corner string holes 42 and 46 located at a full stagger distance "a" of 4.5 mm, as can be seen from FIG. 2 the angle at which the string 40, 44 would diverge from the string bed would be very sharp, making the racquet difficult to string and increasing the possibility of string breakage. Therefore, the offset distance "b" is less than the offset distance "a" of the remaining string holes 36, 38, to reduce such angle. Preferably, the offset distance "b" 2 mm.

In conventional stringing arrangements used in tennis racquets, the corners of the racquet have alternating main and cross string holes. This is done for the purpose of allowing the racquet to string up better. As shown in FIG. 2, the present invention utilizes a conventional string hole arrangement in the corners of the racquet, with alternating main and cross string holes.

Whereas most of the cross string holes 36 lie alternately on opposite sides of the central plane 30, as shown in FIG. 2 consecutive cross string holes 42 in the corners of the racquet lie on the same side of the stringing plane 30. The same is true for the main string holes, where consecutive corner main string holes 44 are on the same side of the center plane 30. However, as mentioned above, this is merely an inherent consequence of using a constant stagger hole pattern with conventional string hole arrangement, because in the conventional arrangement the main and cross-string holes alternate in the corners.

More particularly, due to the curvature of the racquet frame, in the corners of the racquet the uppermost cross string crosses one fewer main string on each side of the racquet than the cross string lying immediately below it (the same is true in the lower corners). In crossing the racquet face, the uppermost cross string passes alternately above and below successive main strings. The same is true for the cross string below the uppermost cross string (the "second cross string"), except that in order to be interwoven into the string bed, the second cross string must pass on the opposite side of each main string. Because in the corners the second cross string crosses one more string, on each side of the racquet, than the uppermost cross string, the ends of both cross strings end up on the same side of the center plane 30, and thus the string hole 42 for the uppermost cross string must necessarily lie on the same side of the center plane 30 as the string hole 42 for the second cross string.

Figure 3:
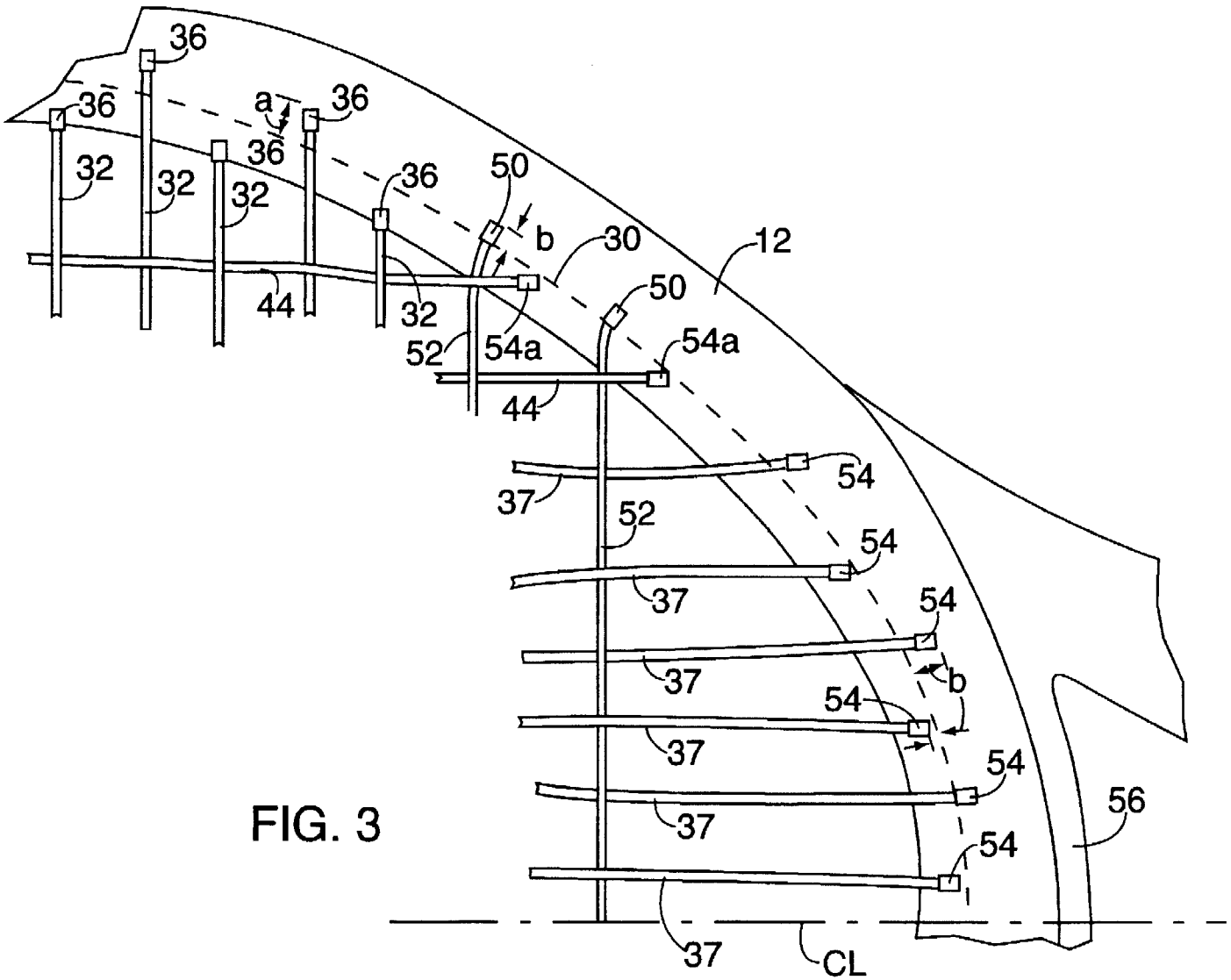
FIG. 3 is a perspective view, on an enlarged scale, of the lower head portion of the racquet of FIG. 1.

FIG. 3 shows the lower corner of one side of the head portion 12, the other side being a mirror image about center line "CL". The holes 36 for the cross strings 32, except in the corners, all lie at the constant offset distance "a". The corner holes 50 for the bottom two cross strings 52 lie at the reduced stagger distance "b". Unlike the top of the racquet, all of the holes 54, **54*a* for the bottom ends of the main strings 37, 44, most of which are formed in the throat bridge 56, lie at the reduced offset distance "b". As in the case of the upper part of the head 12, the holes 36 and 54 lie alternately on opposite sides of the center string plane 30, except in the corners. In the two lower corners, consecutive cross string holes 50, and consecutive main string holes 54*a*, lie on the same side of center plane 30 due to the fact that the lowest cross string 52 crosses one fewer main string 44** on each side of the racquet.

As shown in the figures, the non-corner cross strings 32 extend from the string bed 17 to the frame 12 in planes perpendicular to the center line "CL", and the non-corner main strings 37 extend in planes parallel to the center line "CL" and perpendicular to the string bed 17. This is because, except in the corners, the force applied to each string by the crossing string is in a direction perpendicular to the string bed 17.

As shown in FIG. 3, because the staggered ends of the cross strings 32 and 52 wrap partially around the outer peripheral main strings 44, they tend to push the outer main strings toward the middle of the racquet face. Similarly, the staggered ends of the main strings 37 and 44 tend to push the lowest cross strings 52 upwardly. As a result, the ends of the corner strings 44, 52 diverge from the string bed at an angle, as shown in FIG. 3.

In order to reduce the angle at which the corner string ends diverge from the string bed, the offset distance "b" of the holes from the center plane was reduced in the corners, and also the distance between the string hole pairs 50, **54*a***, for respective crossing main and cross strings was increased.

Thus, as shown in FIGS. 2–3, the string ends are redirected to extend partially toward one another, and the tension of the strings applies an in-plane component of force to compensate for the lateral pulling component applied by the other crossing string (e.g., in the case of cross strings 50, the angled string ends tend to pull the strings 50 toward the handle end of the racquet, which compensates for the upward component of force applied by the corner main strings 44).

As shown in the figures, the main and cross strings are formed using a continuous string, in which connecting sections 60 wrap around the outside of the frame to cross between consecutive string holes. Preferably, a grommet strip 62 is provided on either side of the head 12, and a bumper strip 64 lies over the frame in the tip region. The grommet strips 62 and bumper strip 64 include grommet pegs that project through the string holes, as shown, and the outer surface of the grommet strips 62 and bumper strip 64 acts as a seat for the string connecting sections 60, to prevent the strings from biting into the frame. As also shown, preferably the grommet strip 62 and bumper strip 64 are provided with cutouts 66, 68 to reduce weight.

The foregoing represents a preferred embodiment of the invention. Variations and modifications will be apparent to persons skilled in the art, without departing from the inventive concepts disclosed herein. For example, a tennis racquet can be made with a constant stagger distance around the frame if the offset distance of the staggered string holes is maintained sufficiently small, e.g., 2 mm. Also, although I prefer to use reduced stagger for the main string holes in the throat bridge, a full stagger distance, reduced in the corners, could be employed. All such modifications and variations are intended to be within the skill of the art, as defined in the following claims.

I claim:

1. In a tennis racquet comprising a generally elliptical head portion defining a stringing area, a plurality of main strings and a plurality of cross strings interwoven to form a strung surface lying generally in a center plane, a plurality of string holes located around said head portion for receiving said string ends, wherein said head portion includes upper and lower corners, each corner having at least four corner string holes for receiving alternating cross string and main string ends, the improvement wherein said string holes lie alternately on opposite sides of said center plane completely around the head portion, wherein said string holes other than in said corners lie at a first offset distance from said center plane, and wherein said corner string holes lie at a second offset distance which is less than said first offset distance.

2. A racquet comprising:

a frame, handle means on said frame for manipulating said frame, said frame having a longitudinal direction extending from said handle means upward through said frame and having a transverse direction substantially at right angles to said longitudinal direction, said frame defining an opening therein, a string bed plane in said opening, said string bed plane having first and second sides, walls in said frame defining string holes for strings which are interwoven to form a string bed in said string bed plane, at least some of said holes extending to said frame opening on opposite sides of said string bed plane; and strings through said holes, said strings being interwoven within said frame to define a string bed within the periphery of said interwoven strings, said string holes in said frame being positioned and said strings being interwoven in such a manner that, within said periphery, said string bed has a plurality of longitudinal strings lying substantially parallel to said longitudinal direction and has a plurality of transverse strings lying substantially parallel to said transverse direction, at least some of said longitudinal and said transverse strings being interwoven to form a string bed laterally defined by said interwoven strings, said strings being arranged so that some consecutive longitudinal strings pass from said frame to said string bed plane on the same side of said string bed plane and some consecutive longitudinal strings pass from said frame to said string bed plane alternately from said first and second sides of said string bed plane and where some consecutive transverse strings pass from said frame to said string bed plane on said same side of said string bed plane and some consecutive transverse strings pass from said frame to said string bed plane alternately from said first and second sides of said string bed plane so that said string bed is supported all the way around and in the corners by strings which are divergent from said string bed plane only outside of the string bed to provide support for said string bed.

3. The racquet of claim 2 wherein a longitudinal string and a transverse string engage each other at a corner of said string bed and each bends in an obtuse angle at their inter-engagement point to diverge outside of said string bed, the bisectors of said obtuse angles being coincident.

4. The racquet of claim 3 wherein said strings at said engagement point bend at an angle toward said frame as viewed toward said string bed and pass through string holes in said frame to maintain said strings divergent from said plane outside of said string bed.

5. The racquet of claim 2, wherein said strings are arranged so that at least some of said longitudinal strings extend to said string bed from said first side of said string bed plane and pass the nearest transverse string on said second side of said string bed plane, and at least some of said longitudinal strings extend to said string bed from said second side of said string bed plane and pass the nearest transverse string on said first side of said string bed plane, adjacent ones of said longitudinal strings at a corner of said string bed pass string holes in said frame on the same side of said string bed plane, each transverse string passing through its hole on said first side of said string bed plane passes on the second side of the nearest longitudinal string and each transverse string passing through its hole on said second side of said string bed plane passes on the first side of the nearest longitudinal string so that said string bed is supported all the way around and in the corners by strings which are divergent from said string bed plane only outside of said string bed to provide support for said string bed.

6. The racquet of claim 5, wherein adjacent ones of said transverse strings at a corner of said string bed pass through frame holes in said frame on the same side of said string bed plane.

7. The racquet of claim 6, wherein said adjacent longitudinal strings pass through frame holes on one side of said string bed plane while adjacent ones of said transverse strings pass through frame holes on the opposite side of said string bed plane.

8. The racquet of claim 2, wherein each said longitudinal string passing from its string hole on said first side of said plane engaging on said second side of the first transverse string it reaches, said longitudinal string passing from its string hole on said second side of said plane engaging said first side of the first transverse string it reaches, and, at some of the corners of said string bed, adjacent ones of said longitudinal strings pass into string holes in said frame on the same side of said string plane.

* * * * *